US011681373B1

(12) United States Patent
Karri et al.

(10) Patent No.: US 11,681,373 B1
(45) Date of Patent: Jun. 20, 2023

(54) FINGER MOVEMENT MANAGEMENT WITH HAPTIC FEEDBACK IN TOUCH-ENABLED DEVICES

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Partho Ghosh, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/643,240

(22) Filed: Dec. 8, 2021

(51) Int. Cl.
*G06F 3/01* (2006.01)
*G06F 3/0488* (2022.01)

(52) U.S. Cl.
CPC ............ *G06F 3/016* (2013.01); *G06F 3/0488* (2013.01)

(58) Field of Classification Search
CPC ................................ G06F 3/016; G06F 3/0488
See application file for complete search history.

(56) References Cited

U.S. PATENT DOCUMENTS

| 8,009,022 | B2 * | 8/2011 | Kipman | ................ | A63F 13/285 340/407.1 |
| 8,499,245 | B1 | 7/2013 | Froment | | |
| 9,280,234 | B1 | 3/2016 | Froment | | |
| 10,403,084 | B2 * | 9/2019 | Froy | .................... | G07F 17/3209 |
| 10,915,177 | B2 | 2/2021 | Carter | | |
| 11,181,637 | B2 * | 11/2021 | Gatland | .............. | G01S 15/8995 |
| 11,531,395 | B2 * | 12/2022 | Kappus | .................... | G06F 3/016 |
| 11,543,507 | B2 * | 1/2023 | Carter | ..................... | G06F 3/016 |
| 11,550,395 | B2 * | 1/2023 | Beattie | .................. | G06N 20/00 |
| 11,579,465 | B2 * | 2/2023 | Karafin | ................. | B29C 64/232 |
| 2008/0170123 | A1 * | 7/2008 | Albertson | ................ | G06T 7/20 348/157 |

(Continued)

OTHER PUBLICATIONS

Shinoda & Makino Lab, "Midair Haptics by Airborne Ultrasound Tactile Display (AUTD)," The University of Tokyo, [accessed Dec. 3, 2021], 7 pgs., Retrieved from the Internet:: https://hapislab.org/en/airborne-ultrasound-tactile-display.

(Continued)

*Primary Examiner* — Tadesse Hailu
(74) *Attorney, Agent, or Firm* — Robert R. Aragona

(57) ABSTRACT

An embodiment for managing finger movement with haptic feedback is provided. The embodiment may include receiving historical data regarding a navigation pattern of a user on a device. The embodiment may also include identifying a context of a current interaction of the user with content displayed on a touchscreen of the device. The embodiment may further include predicting an action required of the user. The embodiment may also include identifying a target location on the touchscreen of the device where the action is required. The embodiment may further include in response to determining a finger of the user is not at the target location, generating one or more haptic feedback vectors that guide the finger of the user to the target location. The embodiment may also include prompting the user to touch the touchscreen of the device at the target location.

20 Claims, 6 Drawing Sheets

(56) References Cited

U.S. PATENT DOCUMENTS

| | | | | |
|---|---|---|---|---|
| 2010/0001849 | A1* | 1/2010 | Lee | G06F 3/046 |
| | | | | 340/407.1 |
| 2010/0302015 | A1* | 12/2010 | Kipman | A63F 13/42 |
| | | | | 340/407.1 |
| 2014/0282008 | A1* | 9/2014 | Verard | G03H 1/0005 |
| | | | | 715/728 |
| 2015/0007025 | A1* | 1/2015 | Sassi | G06F 3/0488 |
| | | | | 715/702 |
| 2016/0180636 | A1* | 6/2016 | David | G07F 17/3206 |
| | | | | 463/32 |
| 2016/0202764 | A1* | 7/2016 | Kamata | G06F 3/04847 |
| | | | | 715/702 |
| 2016/0239080 | A1* | 8/2016 | Margolina | G06F 3/017 |
| 2016/0258758 | A1* | 9/2016 | Houston | G01D 5/145 |
| 2016/0291848 | A1* | 10/2016 | Hall | G06F 3/04845 |
| 2017/0300205 | A1* | 10/2017 | Villa | G06F 3/04842 |
| 2018/0356891 | A1* | 12/2018 | Murakami | G06F 3/041 |
| 2019/0138140 | A1* | 5/2019 | Akabane | G06F 3/0412 |
| 2019/0171291 | A1 | 6/2019 | Domenikos | |
| 2019/0179477 | A1 | 6/2019 | Khoshkava | |
| 2019/0196591 | A1 | 6/2019 | Long | |
| 2020/0112646 | A1 | 4/2020 | Tanaka | |
| 2020/0393156 | A1* | 12/2020 | Kim | G06F 3/017 |
| 2021/0397261 | A1* | 12/2021 | Kappus | G10K 11/346 |
| 2022/0016673 | A1* | 1/2022 | Lee | B06B 1/0637 |

OTHER PUBLICATIONS

Villatoro, "Acoustic Particle Assembly," YouTube, Sep. 27, 2016, 5 pgs. https://www.youtube.com/watch?v=EoV_luxqR_M.

Mell et al., "The NIST Definition of Cloud Computing", Recommendations of the National Institute of Standards and Technology, NIST Special Publication 800-145, Sep. 2011, 7 pages.

International Searching Authority, "Notification of Transmittal of the international Search Report and the Written Opinion of the International Searching Authority, or Declaration," Patent Cooperation Treaty, Nov. 28, 2022, 8 pages, International Application No. PCT/CN2022/134545.

* cited by examiner

FINGER MOVEMENT MANAGEMENT WITH HAPTIC FEEDBACK IN TOUCH-ENABLED DEVICES

BACKGROUND

The present invention relates generally to the field of computing, and more particularly to a system for managing finger movement with haptic feedback in touch-enabled devices.

Modern mobile devices have touch display screens where a user is able to interact with icons on the display screens with the touch of a finger. Such mobile devices include, but are not limited to, mobile phones, smartwatches, tablets, desktop computers, as well as laptop computers. Haptic technology may be summarized as any technology that is capable of creating a sensation of touch by applying forces and/or vibrations to communicate with users. Many of the mobile devices described above have touchscreens that provide this touch sensation when the users interact with a graphical user interface (GUI) on these mobile devices. For example, when the user taps on a mobile application, the touchscreen of the mobile device may vibrate to reproduce the sensation the user would feel when touching a real-world physical object.

SUMMARY

According to one embodiment, a method, computer system, and computer program product for managing finger movement with haptic feedback is provided. The embodiment may include receiving historical data regarding a navigation pattern of a user on a device. The embodiment may also include identifying a context of a current interaction of the user with content displayed on a touchscreen of the device. The embodiment may further include predicting an action required of the user based on the historical data and the identified context. The embodiment may also include identifying a target location on the touchscreen of the device where the action is required based on the identified context. The embodiment may further include in response to determining a finger of the user is not at the target location, generating one or more haptic feedback vectors that guide the finger of the user to the target location. The embodiment may also include prompting the user to touch the touchscreen of the device at the target location based on the action required of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
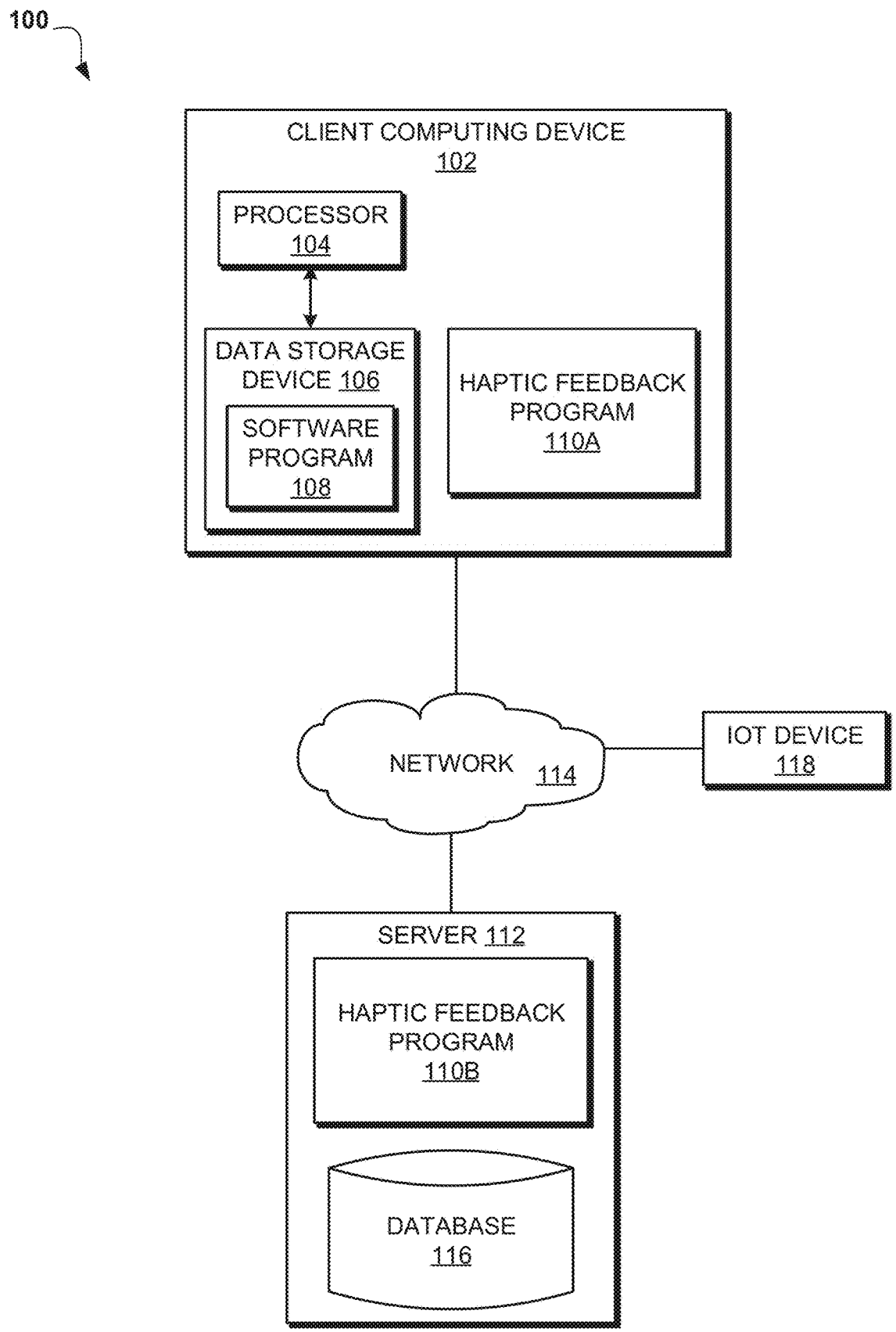
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for managing finger movement with haptic feedback in touch-enabled devices. The following described exemplary embodiments provide a system, method, and program product to, among other things, identify a target location on a device where an action is required of a user and, accordingly, generate one or more haptic vectors that guide a finger of the user to the target location. Therefore, the present embodiment has the capacity to improve mobile device technology by dynamically generating haptic feedback while a user is interacting with a device.

As previously described, modern mobile devices have touch display screens where a user is able to interact with icons on the display screens with the touch of a finger. Such mobile devices include, but are not limited to, mobile phones, smartwatches, tablets, desktop computers, as well as laptop computers. Haptic technology may be summarized as any technology that is capable of creating a sensation of touch by applying forces and/or vibrations to communicate with users. Many of the mobile devices described above have touchscreens that provide this touch sensation when the users interact with a graphical user interface (GUI) on these mobile devices. For example, when the user taps on a mobile application, the touchscreen of the mobile device may vibrate to reproduce the sensation the user would feel when touching a real-world physical object. Visually impaired users and users engaged in multi-tasking may not be able to properly view content on the touchscreen which needs an interaction from the user. For example, if the user receives a notification regarding a text message, the user may be required to tap on a "messages" application in order to view the text message. This problem is typically addressed by generating haptic feedback upon a physical touching of the touchscreen by the user. However, this type of haptic feedback fails to direct a finger of the user from an incorrect location to a target location on the touchscreen which needs the interaction from the user. It may therefore be imperative to have a system in place to provide a haptic interface on a device which allows users to smoothly interact with content on the device. Thus, embodiments of the present invention may provide advantages including, but not limited to, providing a haptic interface on a device which allows users to smoothly interact with content on the device, allowing visually impaired users and users engaged in multi-tasking to interact with content on the device without directly looking at the device, and dynamically generating haptic feedback while users are interacting with the device. The present invention does not require that all advantages need to be incorporated into every embodiment of the invention.

According to at least one embodiment, when a user is interacting with a device, historical data regarding a navigation pattern of a user on a device may be received and a context of a current interaction of the user with content displayed on a touchscreen of the device may be identified in order to predict an action required of the user based on the historical data and the identified context. Upon predicting an action, a target location on the touchscreen of the device where the action is required may be identified in order to determine whether a finger of the user is at the target location. According to at least one embodiment, in response to determining the finger of the user is not at the target location, one or more haptic feedback vectors that guide the finger of the user to the target location may be generated so that the user may be prompted to touch the touchscreen of the device at the target location based on the action required of the user. According to at least one other embodiment, in response to determining the finger of the user is at the target location, the user may be prompted to touch the touchscreen of the device at the target location based on the action required of the user without generating the one or more haptic feedback vectors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a target location on a device where an action is required of a user and, accordingly, generate one or more haptic vectors that guide a finger of the user to the target location.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a haptic feedback program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a haptic feedback program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, transducers and proximity sensors embedded in the mobile device or other device, a camera built into the mobile device or other device, and/or any other IoT Device 118 known in the art for detecting motion and producing sound waves that is capable of connecting to the communication network 114, and transmitting and receiving data with the client computing device 102 and the server 112.

According to the present embodiment, the haptic feedback program 110A, 110B may be a program capable of receiving historical data regarding a navigation pattern of a user, identifying a target location on a device where an action is required of the user, generating one or more haptic vectors that guide a finger of the user to the target location, providing a haptic interface on a device which allows users to smoothly interact with content on the device, allowing visually impaired users and users engaged in multi-tasking to interact with content on the device without directly looking at the device, and dynamically generating haptic feedback while users are interacting with the device. The haptic feedback method is explained in further detail below with respect to FIG. 2.

Figure 2:
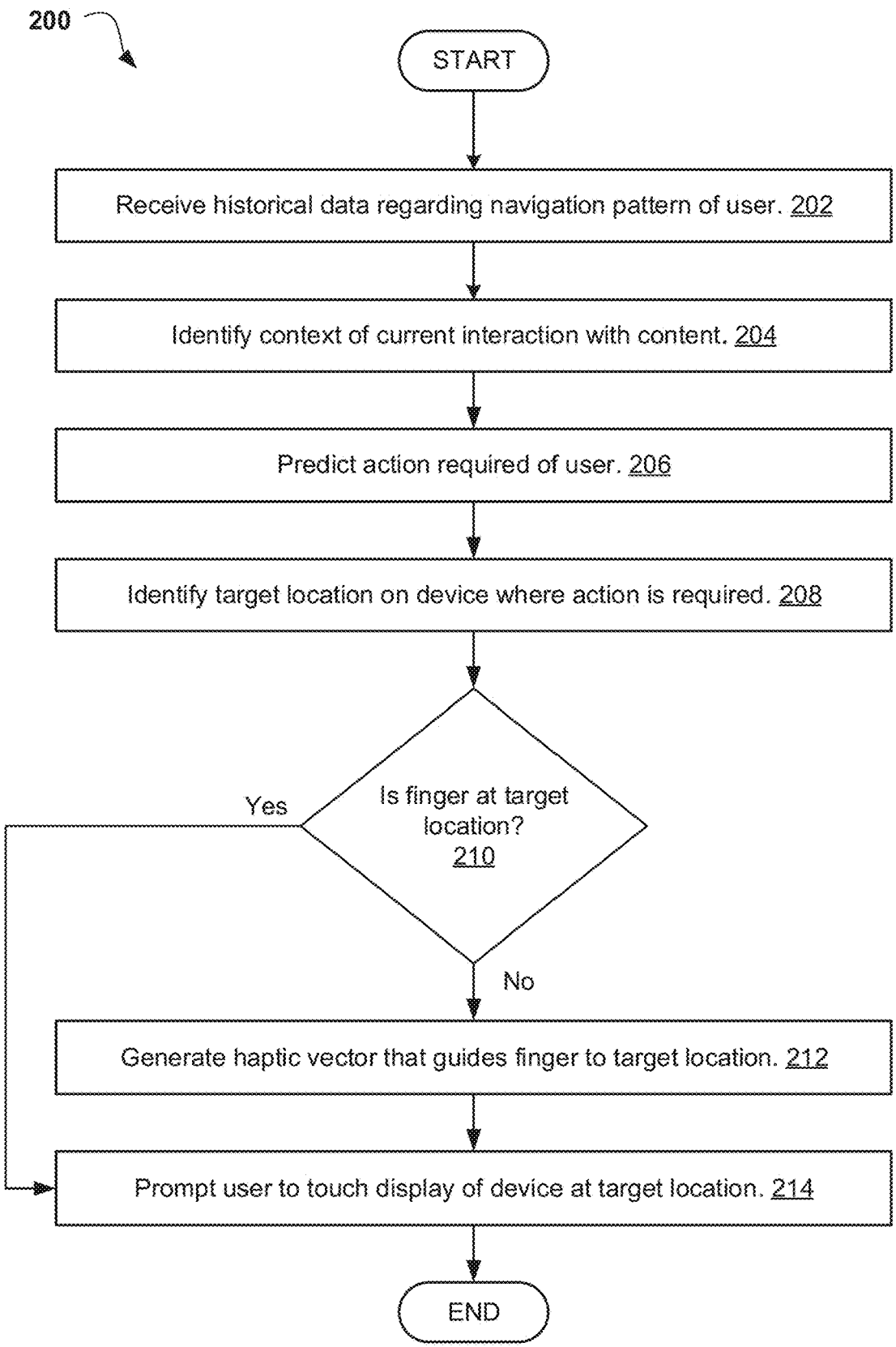
FIG. 2 illustrates an operational flowchart for managing finger movement with haptic feedback in touch-enabled devices in a haptic finger movement management process according to at least one embodiment.

Referring now to FIG. 2, an operational flowchart for managing finger movement with haptic feedback in touch-enabled devices in a haptic finger movement management process 200 is depicted according to at least one embodiment. At 202, the haptic feedback program 110A, 110B receives the historical data regarding the navigation pattern of the user on the device. The device may include any device having touchscreen capability, such as a mobile device, laptop computer, and desktop computer. As the user interacts with content displayed on the touchscreen of the device, the haptic feedback program 110A, 110B may track and record the finger movement patterns of the user.

According to at least one embodiment, the navigation pattern may include how the user interacts with particular content displayed on the touchscreen of the device. For example, when the user is listening to music on a music streaming application or watching a video on a video streaming application, the user may slide the scroll bar to skip over advertisements or skip to a particular verse of the song or section of the music video. In another example, when the user is sending messages in a text messaging application or other instant messaging application, the user may frequently insert emojis, GIFs, and/or photos into the conversation. These interactions may be tracked and stored as historical data in a database, such as database 116.

According to at least one other embodiment, the navigation pattern may include how the user interacts with the touchscreen of the device itself. For example, the user may interact with the haptic interface of the touchscreen by hovering a finger in mid-air over the touchscreen, or the user may physically touch the touchscreen to interact with content on the touchscreen. These interactions may also be tracked and stored as historical data in a database, such as database 116. A plurality of proximity sensors may be utilized by the haptic feedback program 110A, 110B to detect whether the user is hovering the finger in mid-air over the touchscreen or physically touching the touchscreen.

Then, at 204, the haptic feedback program 110A, 110B identifies the context of the current interaction of the user with the content displayed on the touchscreen of the device. The current interaction may be a real-time interaction between the user and the content displayed on the touchscreen.

According to at least one embodiment, and as described above with respect to step 202, the context of the current interaction may be the particular content displayed on the touchscreen of the device, including, but not limited to, listening to music on a music streaming application, watching a video on a video streaming application, and/or sending messages in a text messaging application or other instant messaging application. It may be appreciated that the context of the current interaction may also be identified when the touchscreen is off. For example, many devices have screensavers that display certain content when the touchscreen is off, such as icons associated with particular applications. Continuing the example, the user may receive a text message when the screensaver is displayed. A "messages" icon may appear on the screensaver to inform the user that a text message has been received in the "messages" application.

According to at least one other embodiment, and as described above with respect to step 202, the context of the current interaction may include whether the user is hovering the finger in mid-air over the touchscreen or physically touching the touchscreen. Additionally, when the finger of the user is hovering in mid-air over the touchscreen, the proximity sensors may be used by the haptic feedback program 110A, 110B to determine a distance of the gap between the finger and the touchscreen, described in further detail below with respect to step 212. For example, the finger may be at a distance of one inch (i.e., 2.54 cm) from the touchscreen of the device.

Next, at 206, the haptic feedback program 110A, 110B predicts the action required of the user. The action required is predicted based on the historical data and the identified context as described above with respect to steps 202 and 204. For example, when the identified context is sending messages in a text messaging application or other instant messaging application, if the user historically inserts emojis, GIFs, and/or photos into the conversation, the haptic feedback program 110A, 110B may predict the action required is to send the emojis, GIFs, and/or photos via the text messaging application or other instant messaging application.

In another example, when the identified context is listening to music on a music streaming application or watching a video on a video streaming application, if the user historically slides the scroll bar to skip over advertisements or skip to a particular verse of the song or section of the music video, the haptic feedback program 110A, 110B may predict the action required is to skip over advertisements or skip to a particular verse of the song or section of the music video. It may be appreciated that the examples described above are not intended to be limiting, and that in embodiments of the present invention other actions required of the user may be predicted in accordance with the identified context of the current interaction and the historical data.

Then, at 208, the haptic feedback program 110A, 110B identifies the target location on the touchscreen of the device where the action is required of the user. The target location is identified based on the identified context of the current interaction. The target location may be a button displayed on the touchscreen of the device that may be tapped by the user to perform the required action. Continuing the example above where the identified context is listening to music on a music streaming application or watching a video on a video streaming application, the target location may be the location of the scroll bar on the touchscreen of the device. Continuing the example above where the identified context is sending messages in a text messaging application or other instant messaging application, the target location may be the location of the "send" button and/or the location of the "attachment" button to attach emojis, GIFs, or photos in the conversation. In addition to identifying the target location, the haptic feedback program 110A, 110B may also identify a boundary of the target location. The boundary of the target location may be a perimeter of the button which may be tapped by the user to perform the required action. For example, the perimeter of the button may be the perimeter of the scroll bar or the perimeter of the "attachment" button.

According to at least one embodiment, the touchscreen of the device may be on and displaying a home screen. For example, the home screen may display a plurality of applications and/or widgets which may be accessed by the user. In this embodiment, the target location may be the location of the application itself prior to the opening of the application. Once the particular application is opened, the target location may be the functionality displayed within the application itself (e.g., the scroll bar, the "send" button, and/or the "attachment" button).

According to at least one other embodiment, the touchscreen of the device may be off and displaying the screensaver. For example, the screensaver may display a plurality of icons associated with particular applications. In this embodiment, the target location may be the location of these icons prior to the touchscreen being turned on. For example, the user may double-tap one of these icons when the touchscreen is off in order to turn the touchscreen on and automatically open the particular application associated with the icon. As described above, once the particular application is opened, the target location may be the functionality displayed within the application itself (e.g., the scroll bar, the "send" button, and/or the "attachment" button).

Next, at 210, the haptic feedback program 110A, 110B determines whether the finger of the user is at the target location. The finger of the user may be considered to be at the target location when the finger is physically touching the touchscreen at the target location, and when the finger is in mid-air directly above the touchscreen at the target location (i.e., there is a gap between the finger of the user and the touchscreen of the device). The haptic feedback program 110A, 110B may utilize the plurality of proximity sensors and/or the camera to detect the current position of the finger of the user. For example, the user may be working on a desktop computer and receive a text message on the mobile device. Continuing the example, the user may hover their finger over the mobile device without looking at the mobile device. A random location where the user hovers their finger may be at the target location or at a location that may be different than the target location. For example, the target location may be a button on the touchscreen near the bottom of the mobile device and the user may hover their finger near the top of the mobile device. In this example, it may be necessary to guide the finger of the user from the top of the mobile device to the target location at the bottom of the mobile device. It may be appreciated that the examples described above are not intended to be limiting, and that in embodiments of the present invention the target location and location of the finger of the user may vary.

In response to determining the finger of the user is not at the target location (step 210, "No" branch), the haptic finger movement management process 200 proceeds to step 212 to generate the one or more haptic feedback vectors. In response to determining the finger of the user is at the target location (step 210, "Yes" branch), the haptic finger movement management process 200 proceeds to step 214 to prompt the user to touch the touchscreen of the device at the target location.

Then, at 212, the haptic feedback program 110A, 110B generates the one or more haptic feedback vectors. The one or more haptic feedback vectors are generated to guide the finger of the user to the target location. The haptic feedback program 110A, 110B may include a haptic effect generation module that utilizes a plurality of transducers embedded in the device to generate the one or more haptic feedback vectors. The one or more haptic feedback vectors may be one or more ultrasound waves created by the plurality of transducers that may be felt on the finger of the user.

According to at least one embodiment, the one or more haptic feedback vectors may be generated on the touchscreen of the device. The one or more haptic feedback vectors may be generated on the touchscreen in response to determining the finger of the user is physically touching the touchscreen of the device. For example, the user may physically touch the touchscreen to perform the required action (e.g., move the scroll bar).

According to at least one other embodiment, the one or more haptic feedback vectors may be generated in mid-air above the touchscreen of the device. The one or more haptic feedback vectors may be generated in mid-air above the touchscreen of the device in response to determining there is a gap between the finger of the user and the touchscreen, as described above with respect to step 204. For example, the finger may be at a distance of one inch (i.e., 2.54 cm) from the touchscreen of the device. In this embodiment, when the one or more haptic feedback vectors are generated in mid-air above the touchscreen of the device, the strength of the one or more haptic feedback vectors may be adjusted based on the gap between the finger of the user and the touchscreen such that the user is able to feel the upward force of the one or more haptic feedback vectors on their finger. For example, when the finger of the user is one inch (i.e., 2.54 cm) from the touchscreen of the device, the strength of the one or more haptic feedback vectors may become stronger if the user moves their finger farther away from the touchscreen, whereas the strength of the one or more haptic feedback vectors may become weaker if the user moves their finger closer to the touchscreen.

In either of the above-mentioned embodiments, the one or more generated haptic feedback vectors may become stronger as the finger of the user moves farther away from the target location on the touchscreen of the device. On the contrary, the one or more generated haptic feedback vectors may become weaker as the finger of the user moves closer to the target location on the touchscreen of the device. Thus, the user may know they are moving their finger in the wrong direction if the strength of the one or more haptic feedback vectors gradually becomes stronger, and the user may know they are moving their finger in the correct direction if the strength of the one or more haptic feedback vectors gradually becomes weaker.

Next, at 214, the haptic feedback program 110A, 110B prompts the user to touch the touchscreen of the device at the target location. The user is prompted based on the action required of the user. The prompt may be an absence of the one or more haptic feedback vectors. The absence of the one or more haptic feedback vectors may indicate the finger of the user is at the target location. As described above with respect to step 208, the haptic feedback program 110A, 110B may identify the boundary of the target location, which may be the perimeter of the button which may be tapped by the user to perform the required action. For example, the perimeter of the button may be the perimeter of the scroll bar or the perimeter of the "attachment" button. Thus, within the boundary of the target location, the user may not feel any haptic feedback from the one or more haptic feedback vectors. When the user does not feel any haptic feedback, the user may tap the touchscreen at the target location to perform the required action.

Figure 3:
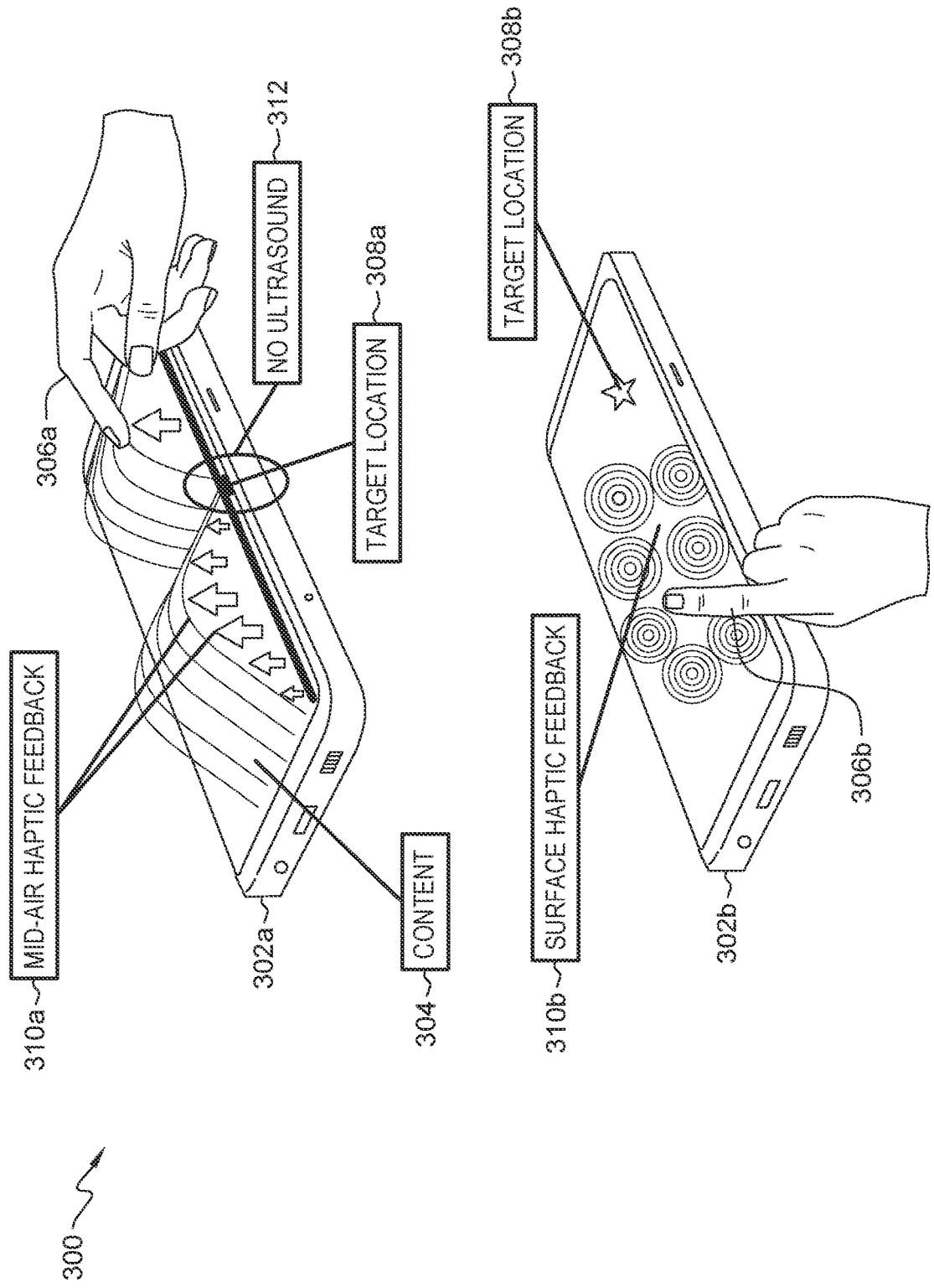
FIG. 3 is an exemplary diagram depicting a haptic feedback interface in a mobile device environment according to at least one embodiment.

Referring now to FIG. 3, an exemplary diagram 300 depicting a haptic feedback interface in a mobile device environment is shown according to at least one embodiment. In the diagram 300, a first mobile device 302a and a second mobile device 302b are shown. The first mobile device 302a and the second mobile device 302b may be displaying content 304 to the user.

Referring to the first mobile device 302a, the finger 306a of the user may be hovering in mid-air over the first mobile device 302a. The target location 308a on the first mobile device 302a may be identified and the haptic feedback may be mid-air haptic feedback 310a. For the first mobile device 302a, the target location 308a may be a scrollbar. The mid-air haptic feedback 310a may guide the finger 306a of the user to the target location 308a. As described above with respect to FIG. 2, there is no haptic feedback (i.e., no ultrasound waves) 312 generated at the target location 308a.

Referring to the second mobile device 302b, the finger 306b of the user may be physically touching the second mobile device 302b. The target location 308b on the second mobile device 302b may be identified and the haptic feedback may be surface haptic feedback 310b. Since the finger 306b of the user is physically touching the second mobile device 302b, there may be no need for the mid-air haptic feedback 310a described above. The surface haptic feedback 310b may guide the finger 306b of the user to the target location 308b.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
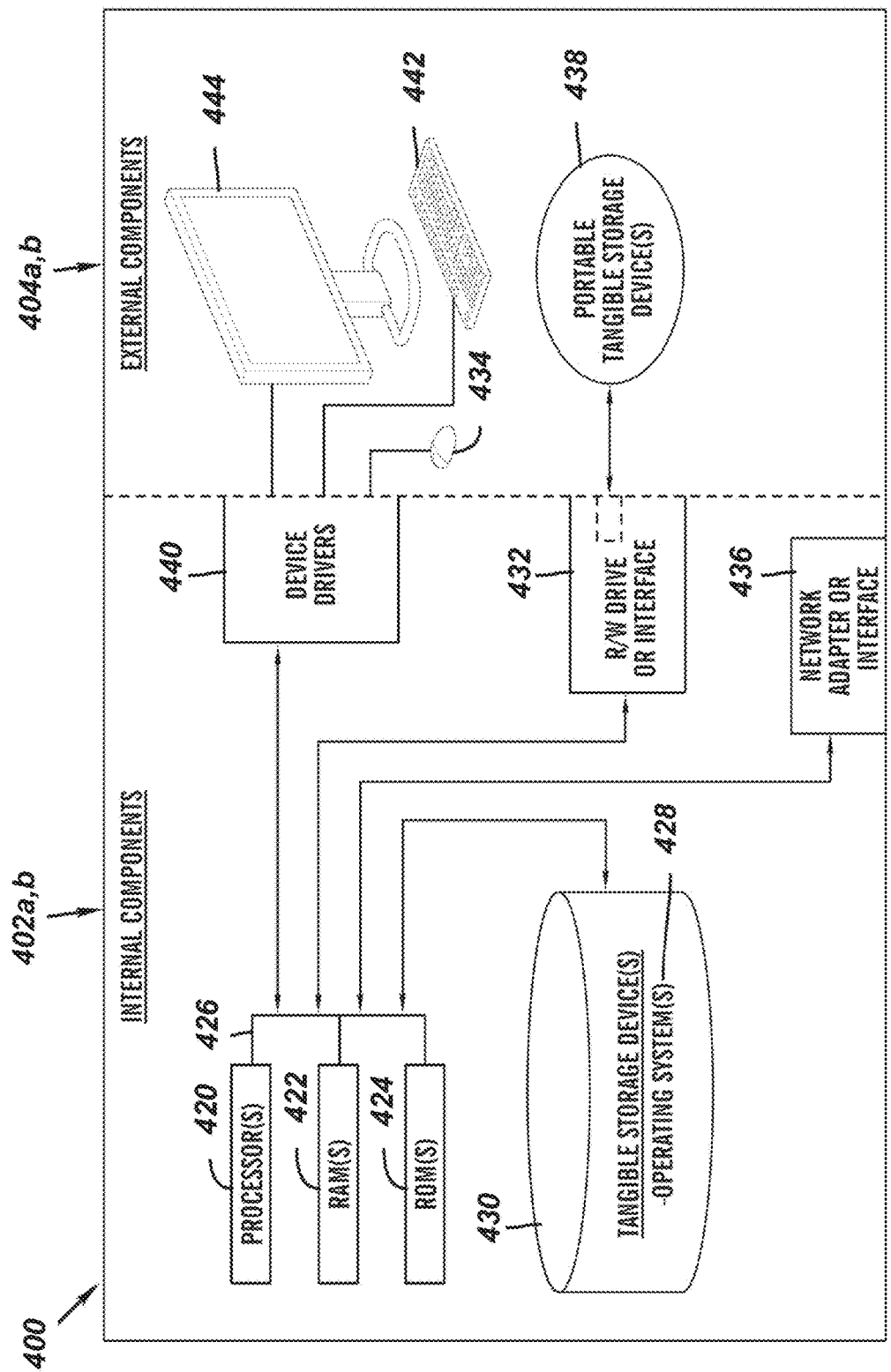
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may be represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the haptic feedback program 110A in the client computing device 102 and the haptic feedback program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the haptic feedback program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the haptic feedback program 110A in the client computing device 102 and the haptic feedback program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the haptic feedback program 110A in the client computing device 102 and the haptic feedback program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
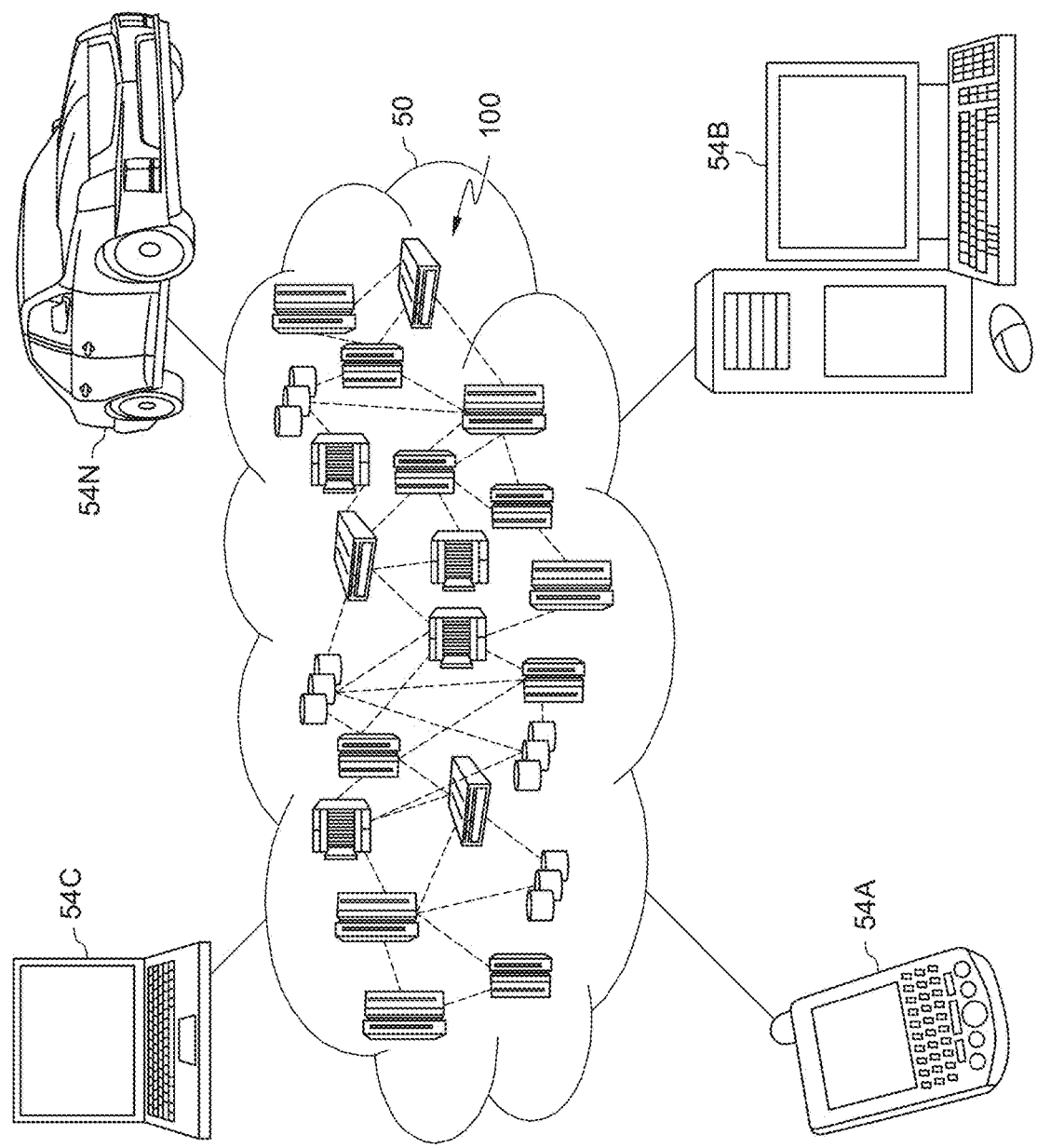
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
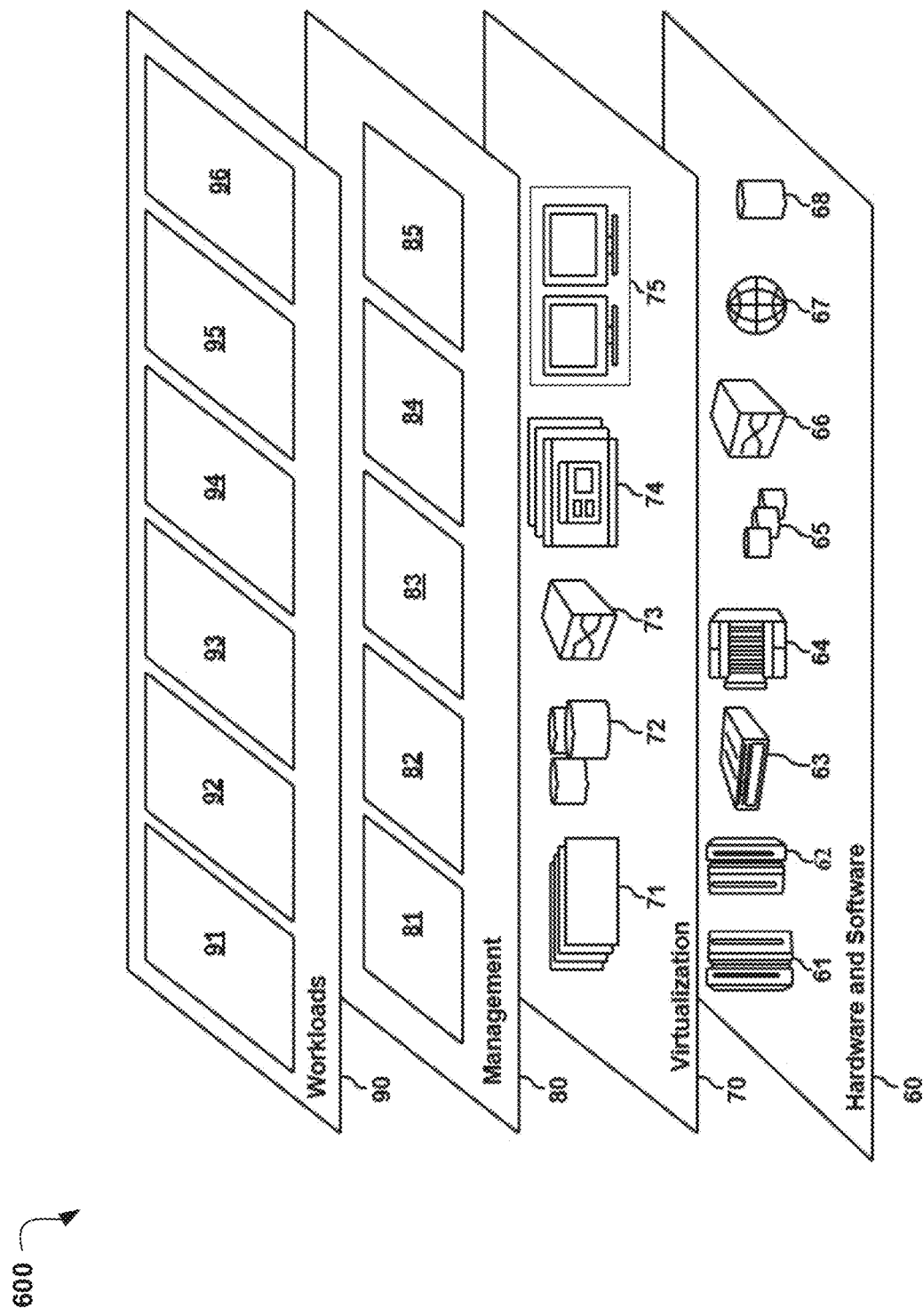
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing finger movement with haptic feedback in touch-enabled devices 96. Managing finger movement with haptic feedback in touch-enabled devices 96 may relate to identifying a target location on a device where an action is required of a user in order to generate one or more haptic vectors that guide a finger of the user to the target location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of managing finger movement with haptic feedback, the method comprising:
    receiving historical data regarding a navigation pattern of a user on a device;
    identifying a context of a current interaction of the user with content displayed on a touchscreen of the device
    predicting an action required of the user based on the historical data and the identified context;

identifying a target location on the touchscreen of the device where the action is required based on the identified context, wherein the identified target location is a button displayed on the touchscreen of the device that is configured to be tapped by the user to perform the required action;

determining whether a finger of the user is at the target location;

in response to determining the finger of the user is not at the target location, generating one or more haptic feedback vectors that guide the finger of the user to the target location; and prompting the user to touch the touchscreen of the device at the target location based on the action required of the user.

2. The computer-based method of claim 1, wherein the one or more haptic feedback vectors are one or more ultrasound waves created by a plurality of transducers embedded in the device.

3. The computer-based method of claim 1, wherein the one or more haptic feedback vectors become stronger as the finger of the user moves farther away from the target location on the touchscreen of the device, and wherein the one or more haptic feedback vectors become weaker as the finger of the user moves closer to the target location on the touchscreen of the device.

4. The computer-based method of claim 1, wherein the prompt is an absence of the one or more haptic feedback vectors, wherein the absence of the one or more haptic feedback vectors indicates the finger of the user is at the target location.

5. The computer-based method of claim 1, wherein the one or more haptic feedback vectors are generated on the touchscreen of the device in response to determining the finger of the user is physically touching the touchscreen of the device.

6. The computer-based method of claim 1, wherein the one or more haptic feedback vectors are generated in mid-air above the touchscreen of the device in response to determining there is a gap between the finger of the user and the touchscreen of the device.

7. The computer-based method of claim 6, wherein a strength of the one or more generated haptic feedback vectors is adjusted based on the gap between the finger of the user and the touchscreen of the device.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving historical data regarding a navigation pattern of a user on a device;

identifying a context of a current interaction of the user with content displayed on a touchscreen of the device predicting an action required of the user based on the historical data and the identified context;

identifying a target location on the touchscreen of the device where the action is required based on the identified context, wherein the identified target location is a button displayed on the touchscreen of the device that is configured to be tapped by the user to perform the required action;

determining whether a finger of the user is at the target location;

in response to determining the finger of the user is not at the target location, generating one or more haptic feedback vectors that guide the finger of the user to the target location; and prompting the user to touch the touchscreen of the device at the target location based on the action required of the user.

9. The computer system of claim 8, wherein the one or more haptic feedback vectors are one or more ultrasound waves created by a plurality of transducers embedded in the device.

10. The computer system of claim 8, wherein the one or more haptic feedback vectors become stronger as the finger of the user moves farther away from the target location on the touchscreen of the device, and wherein the one or more haptic feedback vectors become weaker as the finger of the user moves closer to the target location on the touchscreen of the device.

11. The computer system of claim 8, wherein the prompt is an absence of the one or more haptic feedback vectors, wherein the absence of the one or more haptic feedback vectors indicates the finger of the user is at the target location.

12. The computer system of claim 8, wherein the one or more haptic feedback vectors are generated on the touchscreen of the device in response to determining the finger of the user is physically touching the touchscreen of the device.

13. The computer system of claim 8, wherein the one or more haptic feedback vectors are generated in mid-air above the touchscreen of the device in response to determining there is a gap between the finger of the user and the touchscreen of the device.

14. The computer system of claim 13, wherein a strength of the one or more generated haptic feedback vectors is adjusted based on the gap between the finger of the user and the touchscreen of the device.

15. A computer program product, the computer program product comprising:
one or more computer-readable tangible storage medium and program instructions stored on at least one of the one or more computer-readable tangible storage medium, the program instructions executable by a processor capable of performing a method, the method comprising:

receiving historical data regarding a navigation pattern of a user on a device;

identifying a context of a current interaction of the user with content displayed on a touchscreen of the device predicting an action required of the user based on the historical data and the identified context;

identifying a target location on the touchscreen of the device where the action is required based on the identified context, wherein the identified target location is a button displayed on the touchscreen of the device that is configured to be tapped by the user to perform the required action;

determining whether a finger of the user is at the target location;

in response to determining the finger of the user is not at the target location, generating one or more haptic feedback vectors that guide the finger of the user to the target location; and prompting the user to touch the touchscreen of the device at the target location based on the action required of the user.

16. The computer program product of claim 15, wherein the one or more haptic feedback vectors are one or more ultrasound waves created by a plurality of transducers embedded in the device.

17. The computer program product of claim 15, wherein the one or more haptic feedback vectors become stronger as the finger of the user moves farther away from the target location on the touchscreen of the device, and wherein the one or more haptic feedback vectors become weaker as the finger of the user moves closer to the target location on the touchscreen of the device.

18. The computer program product of claim 15, wherein the prompt is an absence of the one or more haptic feedback vectors, wherein the absence of the one or more haptic feedback vectors indicates the finger of the user is at the target location.

19. The computer program product of claim 15, wherein the one or more haptic feedback vectors are generated on the touchscreen of the device in response to determining the finger of the user is physically touching the touchscreen of the device.

20. The computer program product of claim 15, wherein the one or more haptic feedback vectors are generated in mid-air above the touchscreen of the device in response to determining there is a gap between the finger of the user and the touchscreen of the device.

* * * * *